United States Patent
Bradski et al.

(10) Patent No.: US 6,768,509 B1
(45) Date of Patent: Jul. 27, 2004

(54) METHOD AND APPARATUS FOR DETERMINING POINTS OF INTEREST ON AN IMAGE OF A CAMERA CALIBRATION OBJECT

(75) Inventors: Gary R. Bradski, Palo Alto, CA (US); Jean-Yves Bouguet, Santa Clara, CA (US); Vadim Pisarevsky, Nizhny Novgorod (RU); Valery Mosyagin, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 935 days.

(21) Appl. No.: 09/592,071

(22) Filed: Jun. 12, 2000

(51) Int. Cl.$^7$ .................. H04M 5/225; H04M 17/02
(52) U.S. Cl. .............. 348/207.99; 348/187; 348/222.1
(58) Field of Search .................. 348/207.99, 222.1, 348/252, 253, 254, 175, 179, 180, 181, 182, 187, 188; 382/209, 194; 358/504

(56) References Cited

U.S. PATENT DOCUMENTS

| | | | | |
|---|---|---|---|---|
| 4,285,004 A | * | 8/1981 | Morrison et al. | 348/176 |
| 4,326,219 A | * | 4/1982 | Griesshaber | 348/251 |
| 6,618,076 B1 | * | 9/2003 | Sukthankar et al. | 348/180 |

OTHER PUBLICATIONS

Sturm et al., "On Plane–Based Camera Calibration: A General Algorithm, Singularities, Applications", 1999 IEEE, 6 pages.

Zhengyou Zhang, "Flexible Camera Calibration By Viewing a Plane From Unknown Orientations", 1999 IEEE, 8 pages.

Heikkila et al., "A Four–step Camera Calibration Procedure with Implicit Image Correction", 7 pages.

Heikkila et al., "Calibration Procedure for Short Focal Length Off–the–shelf CCD cameras", 5 pages.

* cited by examiner

*Primary Examiner*—Aung Moe
(74) *Attorney, Agent, or Firm*—Sharimine N. Green

(57) ABSTRACT

The present invention allows for the locations of points of interest in a calibration object in a calibration image for a digital camera to be identified automatically. The image is an array of pixels corresponding to the calibration object, which has a known reference pattern. In a preferred embodiment, the invention includes receiving an array of pixels produced by a camera, classifying each pixel of the image as light or dark, extracting contours from the image by identifying lines between light and dark pixels, comparing the extracted contours to the shapes of the known reference pattern, and identifying the shapes of the known reference pattern in the image using the extracted contours. Preferably, the image is a color image, and the color information in the pixels of the image are converted into gray scale values to render the image as a gray scale image before the pixels are classified. Classifying each pixel includes applying a brightness threshold to each pixel of the image to classify those pixels having a brightness greater than the threshold as light and those below the threshold as dark.

19 Claims, 8 Drawing Sheets

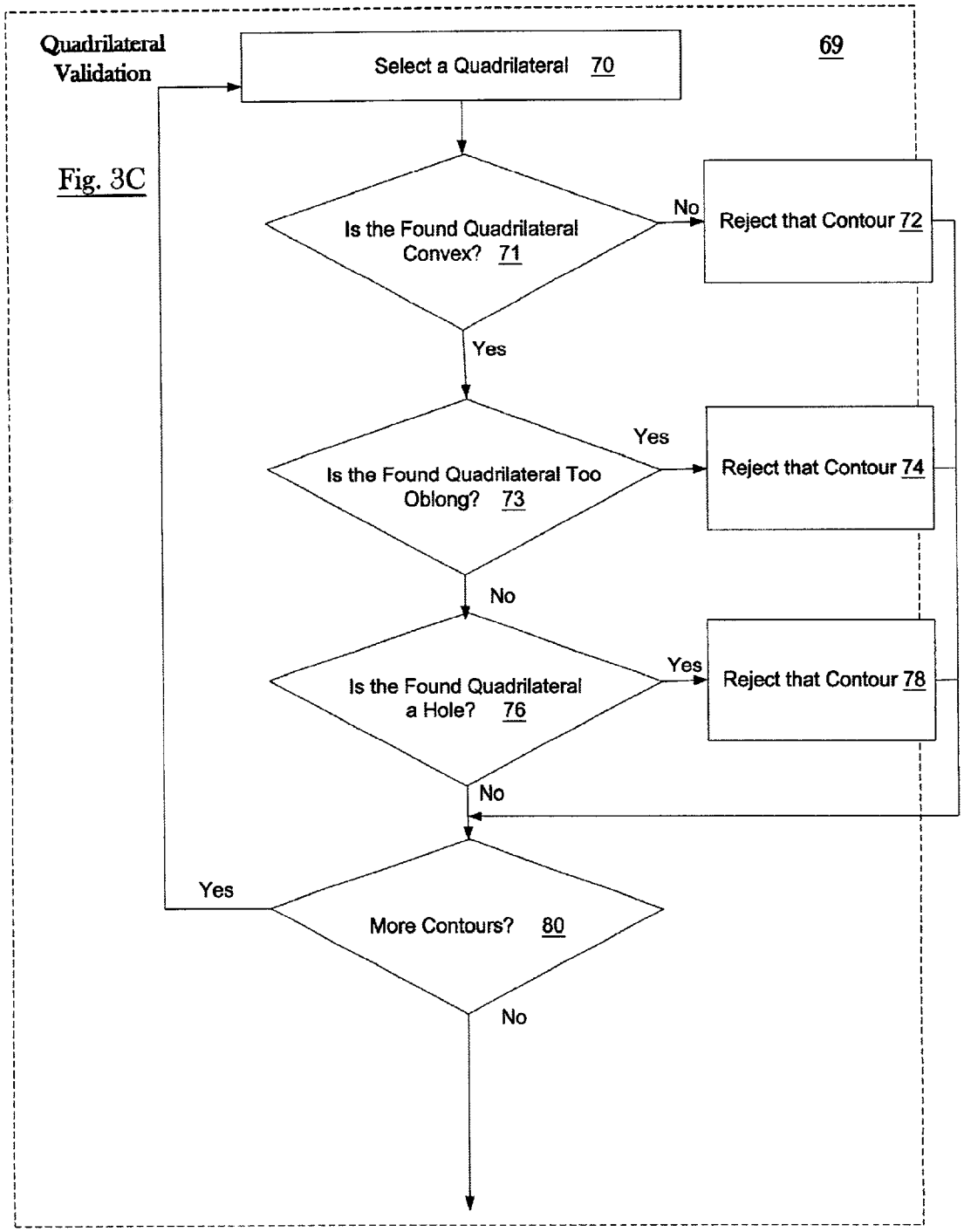

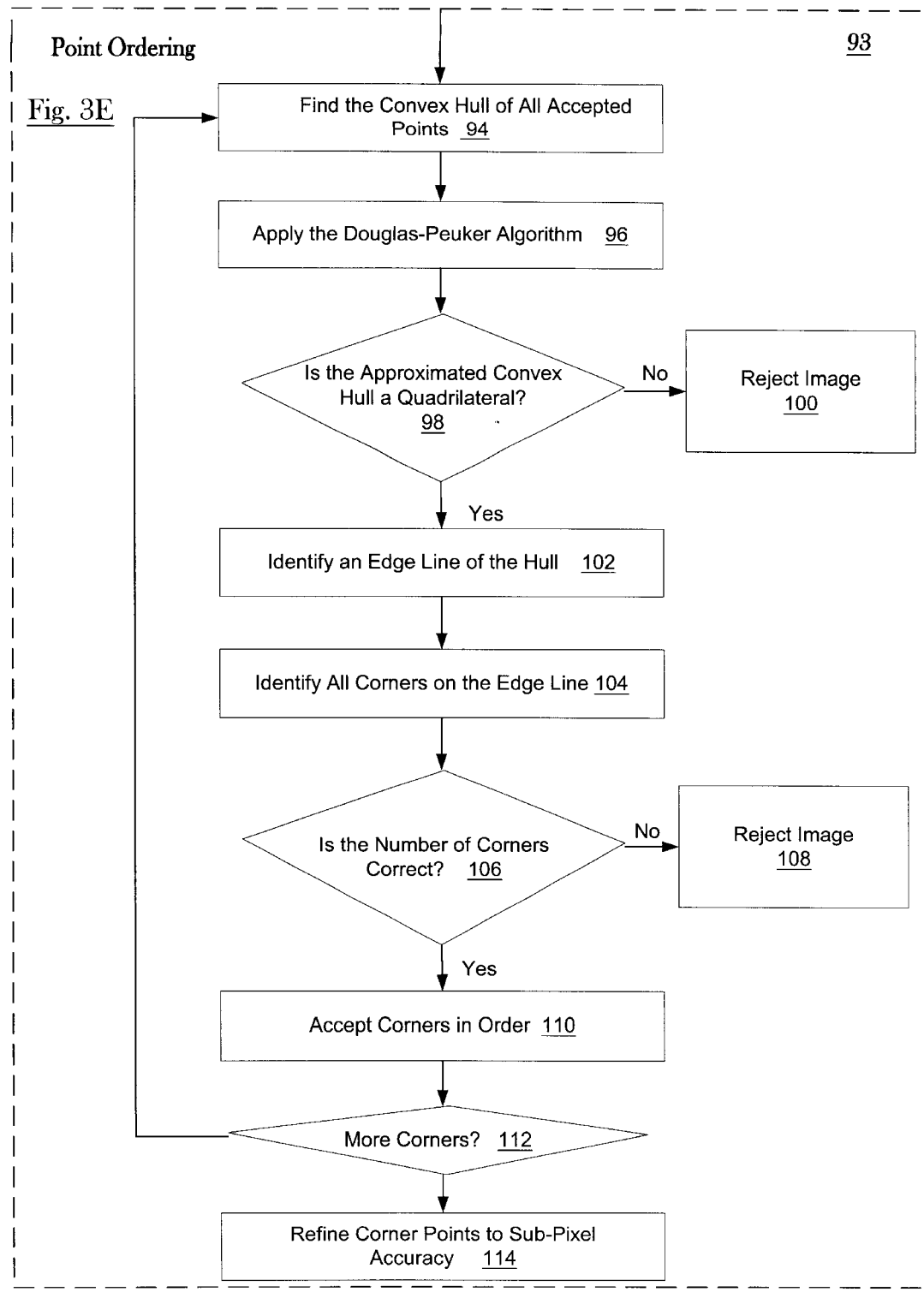

METHOD AND APPARATUS FOR DETERMINING POINTS OF INTEREST ON AN IMAGE OF A CAMERA CALIBRATION OBJECT

FIELD OF THE INVENTION

This invention relates to calibrating digital cameras for single and stereo installations in general, and more specifically to determining the locations of points of interest on an image of a calibration object for application in calibrating the camera.

BACKGROUND OF THE INVENTION

A great number of tasks can be aided by the use of accurate digital cameras. Camera accuracy is particularly important in machine vision and in stereovision. Accurately calibrated cameras can be used in machine vision, for example, for guiding equipment and for quality control. Accurately calibrated stereo cameras can be used, for example, for capturing the shape of three dimensional objects, for distinguishing foreground and background subjects and for tracking the three dimensional movement of machinery or people. For stereovision, the cameras must be calibrated individually and also to each other.

Digital cameras may suffer from any of a variety of different defects that reduce the accuracy of the image obtained. Many of the defects reside in the photosensor array which is typically an array of CCDs (Charge-Coupled Devices) or an array of CMOS (Complementary Metal Oxide Semiconductor) photodetectors. Some of the primary sources of errors are defects in the individual photo detecting elements of the photosensor array, inaccuracies in the orientation of the photosensor array within the camera body, inaccuracies in the relationship between the plane of the photosensor array and the optical axis of the camera lens and distortions, particularly radial and tangential distortions, in the lens. Other sources of errors can also occur. Most or all of these error sources can be compensated or corrected through careful calibration. This allows less expensive photosensor arrays, cameras and lenses to be used than previously possible. Stereovision systems require at least two cameras that both view the same object. Through triangulation of images obtained by the two cameras, the three dimensional position of an object in the field of view of the two cameras can be determined. In order to do this, the relative position of the cameras and the elements of each camera's optical sensor array must be accurately known. Calibration can be used to compensate for misalignment of the cameras or for inconsistencies in the construction between the two cameras.

Calibration algorithms have been developed for digital cameras which use one or more images of a calibration object taken by the digital camera to develop a calibration model. However, in most such algorithms, a human must help identify the position of the calibration object and the general location of its important features in each taken image. This is a tedious and time consuming task especially when applied to multiple images. It also requires a display and human interface with sufficient resolution for the operator to see and indicate the positions of the important calibration object features. Accordingly, the process is more difficult to apply to portable equipment. Finally, it requires some expertise and so is difficult to perform by other than experienced users.

SUMMARY OF THE INVENTION

The present invention allows for the locations of points of interest in a calibration object in a calibration image for a digital camera to be identified. The image is an array of pixels corresponding to the calibration object, which has a known reference pattern. In a preferred embodiment, the invention includes receiving an array of pixels produced by a camera, classifying each pixel of the image as light or dark, extracting contours from the image by identifying lines between light and dark pixels, comparing the extracted contours to the shapes of the known reference pattern, and identifying the shapes of the known reference pattern in the image using the extracted contours. Preferably, the image is a color image, and the color information in the pixels of the image are converted into gray scale values to render the image as a gray scale image before the pixels are classified.

Classifying each pixel includes applying a brightness threshold to each pixel of the image to classify those pixels having a brightness greater than the threshold as light and those below the threshold as dark. The brightness threshold is determined by the mean brightness value of the pixels in the image reduced by a portion of the highest brightness value of any pixel. To extract the contours, the Douglas-Peucker algorithm is applied to approximate a simple polygonal shape. This comprises drawing a connected arc along a contour such that the contour lies within a distance threshold of the closest line of the arc and adaptively modifying the line distance threshold to obtain the calibration object shapes.

BRIEF DESCRIPTION OF THE DRAWINGS

The appended claims set forth the features of the invention with particularity. The invention, together with its advantages, may be best understood from the following detailed description-taken in conjunction with the accompanying drawings of which:

FIGS. 3A to 3E show a flow chart of a preferred embodiment of the invention;

DETAILED DESCRIPTION

Figure 1:
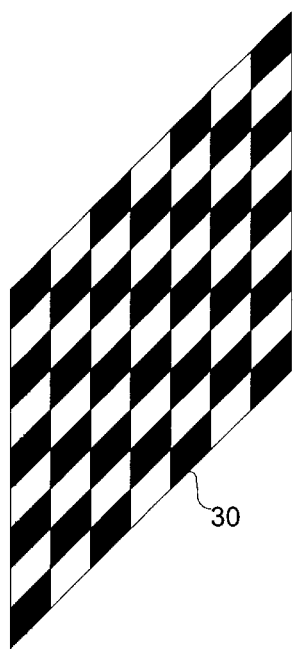
FIG. 1 is a schematic diagram of a camera system in a calibration setup.
Figure 1:
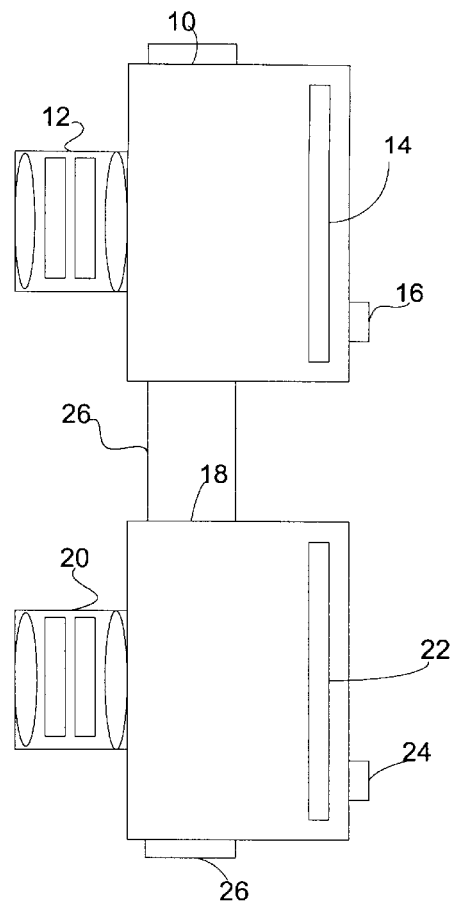

The present invention is intended particularly for calibrating sensor arrays in digital cameras. A test setup for calibrating stereo cameras is shown in FIG. 1. If only one camera is to be calibrated, then the test setup is the same except that only one of the two cameras shown is used. The test setup can be used to calibrate one camera at a time, or as many cameras as can simultaneously image the calibration object. In the test setup both cameras can be calibrated at the same time by exposing both cameras to the same calibration object. The cameras can also be calibrated with respect to each other for stereovision. FIG. 1 shows a first digital camera 10 with a lens system 12 for focusing an image on a sensor array 14. The lens system has several optical elements in several groups and may be of any focal length or varifocal. It may have a variable focus or a fixed focus. Alternatively, the invention can be applied to systems in which there is no lens system so that the image is projected directly onto the sensor array. Typically the sensor is a photo detecting charge-coupled device (CCD), however, the present invention applies to any type of sensor that generates a set of pixel values that represent the image. The digital camera may be designed for still images or motion video or both. The camera also may include an input/output port 16 that allows the camera to be connected to a computer, such as the one described with respect to FIG. 4. Alternatively, the camera can contain the elements of the computer internally. In this case, it is still preferred that the camera provide an input/output port, such as input/output port 16 or a removable storage device such as a tape, disk or semiconductor memory that allows the captured images to be transferred to another computer.

For stereo calibration, another camera 18 is provided similar to the first with a lens system 20, photosensor array 22 and input/output port 24. The two cameras are mounted on a rack 26 that maintains the cameras in consistent alignment. Because of the calibration process it is not necessary that the cameras be mounted on the same rack or that any particular alignment be established as long as both cameras can view the same object. However, it is preferred that the cameras are placed on mounts that are fixed with respect to some reference point, such as the floor or a mounting bench. Each time the cameras are moved with respect to each other they must be recalibrated with respect to each other to enjoy the benefits of stereo imaging. Alternatively, the two cameras may be combined into a single housing. The alignment of the photosensor array is then determined by the housing construction. In such a camera, two lenses, as shown in FIG. 1, or a single shared lens may be used.

Figure 2:
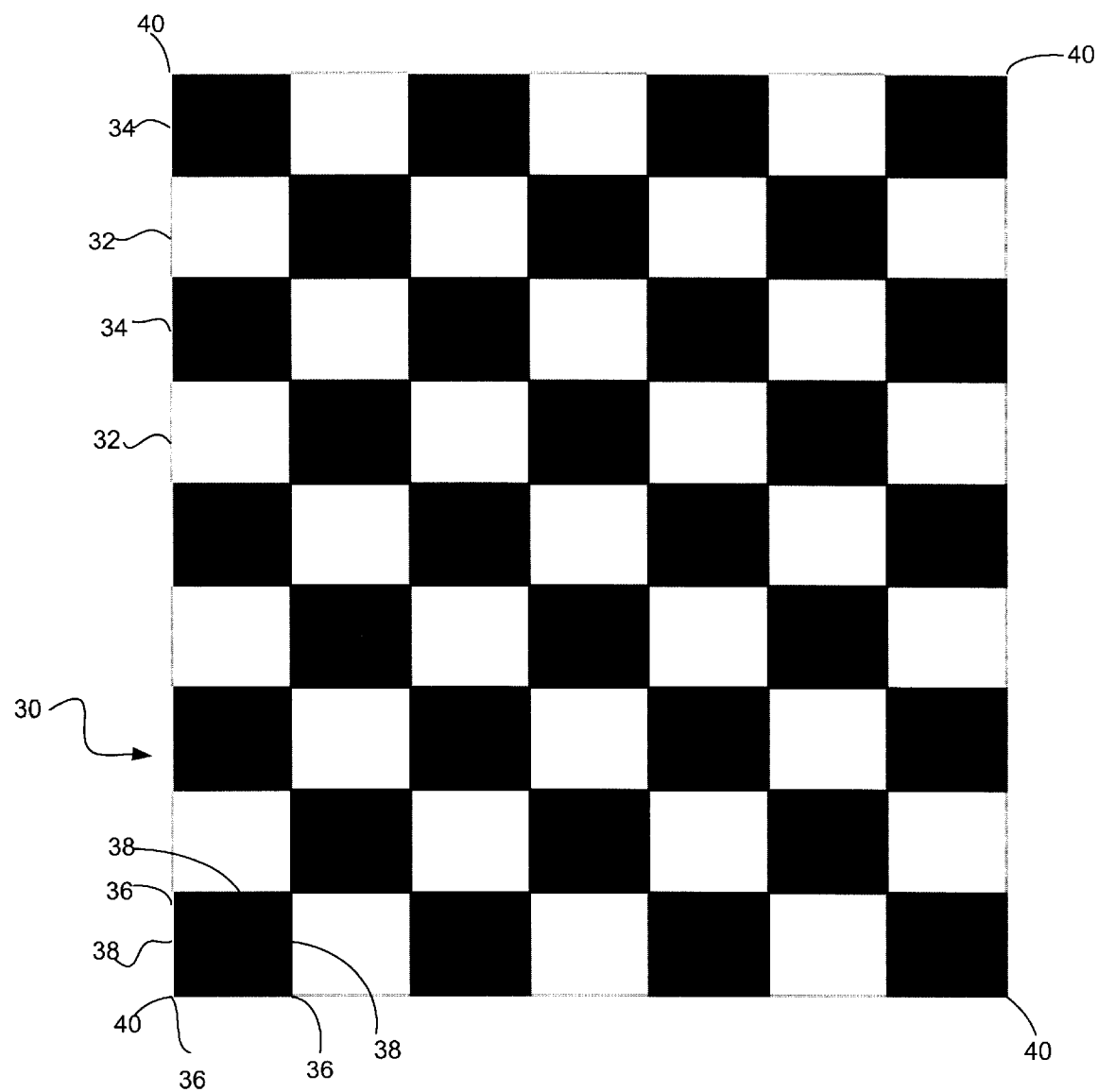
FIG. 2 is a plan view of a preferred calibration object.

Both cameras have a common view of a common calibration object 30 with a known configuration. A preferred calibration object is shown in FIG. 2. It has a checkerboard pattern of alternating white and black squares. It has an aspect ratio that allows it to be printed on conventionally sized paper and then be mounted to a flat surface. The more accurate the printing and the flatter the mounting the more accurate the calibration can be. It has been found that for common inexpensive digital cameras with a plastic lens system and a 640 by 480 pixel RGB (Red, Green Blue) CCD array, reasonable calibration can be achieved by printing the calibration pattern of FIG. 2 on letter size paper using a standard office quality printer and gluing the paper to a paperboard or poster board sheet.

The preferred checkerboard pattern 30 has a sequence of alternating white 32 and black 34 squares propagating in two perpendicular directions. For simplicity of fabrication and use, the pattern is flat and planar, however, cubic, curved and spherical calibration objects are also known and can also be used in the present invention. To calibrate only particular colors, the squares can be colors other than white and black. Each square has four corners 36 and four sides 38 which are shared with the neighboring squares. The sides make up the perimeter of each square and are defined by the corners and vice versa. The preferred pattern has seven squares in one direction and nine squares in the other perpendicular direction but the precise number can be varied to suit different applications. The pattern overall has four corners 40 which define the perimeter of the object for calibration purposes.

Calibration begins by capturing several images of the calibration object. Conventional calibration algorithms use linear algebra equations with multiple unknowns to solve for a set of calibration parameters so multiple images are required to solve for all of the unknowns. It is presently preferred that ten to thirty different images be used for the calibration. The choice will depend on the particular calibration algorithm that is applied. The calibration parameters correct for errors in the lens system, in the photosensor array, and in the construction of the camera. For stereo calibration, the parameters also correct for the alignment of the cameras so that an image of the same object from each camera can be correlated. This allows the images to be correlated and for positions of objects to be determined by triangulation or other means as is well known in the art. Stereo cameras can be calibrated to each other with a single common image, however, it is preferred that two to four images be used. Preferably, the calibration object 30 is waved around in front of or within the field of view of the cameras as the cameras capture multiple, distinct, still images of the calibration object in the different positions. It is preferred that the calibration object be imaged at different angles and distances from the photosensor array. For greater accuracy with focusing lens systems, the camera can be calibrated separately for different focusing distances, in which case it is preferred that the calibration object be imaged at different distances that are within the depth of field for the lens at a single focusing distance.

Figure 3A:
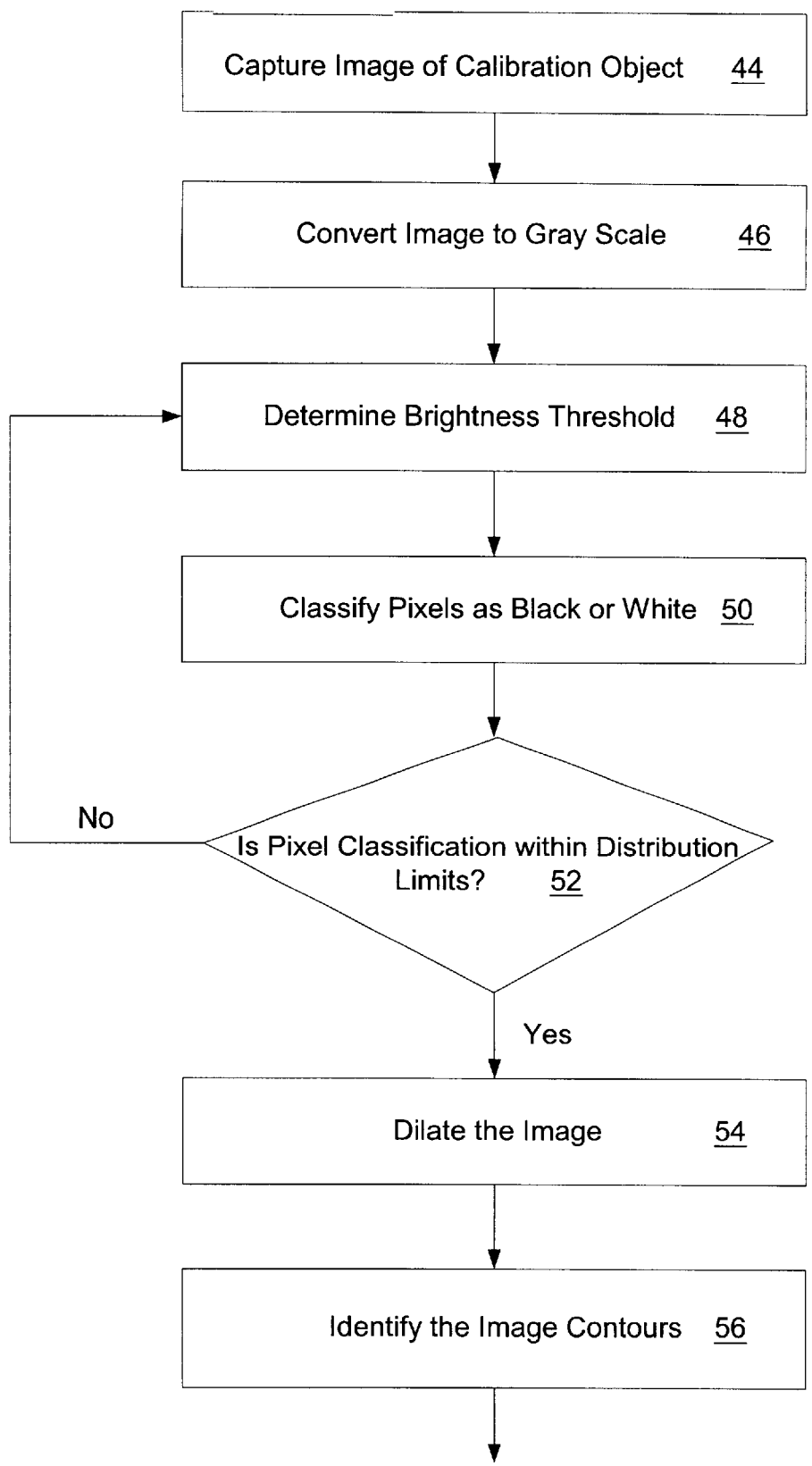

Referring to FIG. 3A, as mentioned above, calibration begins with capturing images 44 of the calibration object 30. It is preferred that the images be downloaded from the camera to a general purpose computer such as the one described in FIG. 4, however, a specialized or portable computing device may also be used. Alternatively, as mentioned above, the calibration may be performed by processing equipment within the camera. The present invention is described in the context of calibrating a color camera for the whole visible light spectrum at one time. The calibration will be described for all colors being calibrated together, although the invention may also be applied to each color individually so that different colors have different calibration parameters. It may also be applied to infrared and ultraviolet cameras. For ease in processing the images, the color pixel values obtained from the sensor array are converted to gray scale values 46. This is done by taking a weighted average for each pixel of the brightness of each of the three colors that make up the pixel. For a typical RGB color CCD image sensor using a Bayer sampling pattern, the preferred weighting is 0.2126Red+0.7152Green+0.0722Blue.

A brightness threshold is then selected 48 and each pixel from the image is then classified as being either black or white 50. Because the calibration object is black and white, this classification will determine sharp outlines in the image that can be compared to the known checkerboard shapes in the calibration object. The pixels are classified by comparing the gray scale value for each pixel to a threshold that preferably has been set in an adaptive way. For simplicity, the threshold is determined by calculating the arithmetic mean brightness for all of the pixels in the image. Then, one-twentieth of the brightness of the brightest pixel in the image is subtracted from the mean. This threshold works effectively for a photosensor array that produces 256 different brightness values for each color, red, green and blue. For images that do not have sufficient contrast, this threshold may be too high or too low. By taking multiple images, some of the low contrast images can be discarded. Alternatively, the threshold can be adjusted as shown in FIG. 3. After the pixels are classified 50, the distribution of pixels in the two categories, black and white, is analyzed 52. If the distribution is not close enough to expected values, then the brightness threshold is adjusted 48 and a second classification is done 50.

Morphological image dilation 54 (a conventional technique well known in the art) is applied to the black and white image so that the boundaries of the white regions in the image are expanded by one pixel. This separates the black squares of the checkerboard calibration object for the contour processing described below. It also turns the intersections at the corners of the calibration object squares in the image into pairs of corner points. Dilation separates the black squares from each other and improves the accuracy with which the corners of the squares can be determined. Dilation is particularly preferred when the features of the calibration object touch each other as in thes squares of the checkerboard pattern of FIG. 2. Dilation is a preferred optional step and can be skipped altogether.

With the pixels reduced to either black or white, the image contours can be identified 56. These contours are then compared to a model of the calibration object to automatically locate and identify the representation of the calibration object in the captured image. The image contours are first identified as closed curves delineating the transition areas between black and white pixels.

Figure 3B:
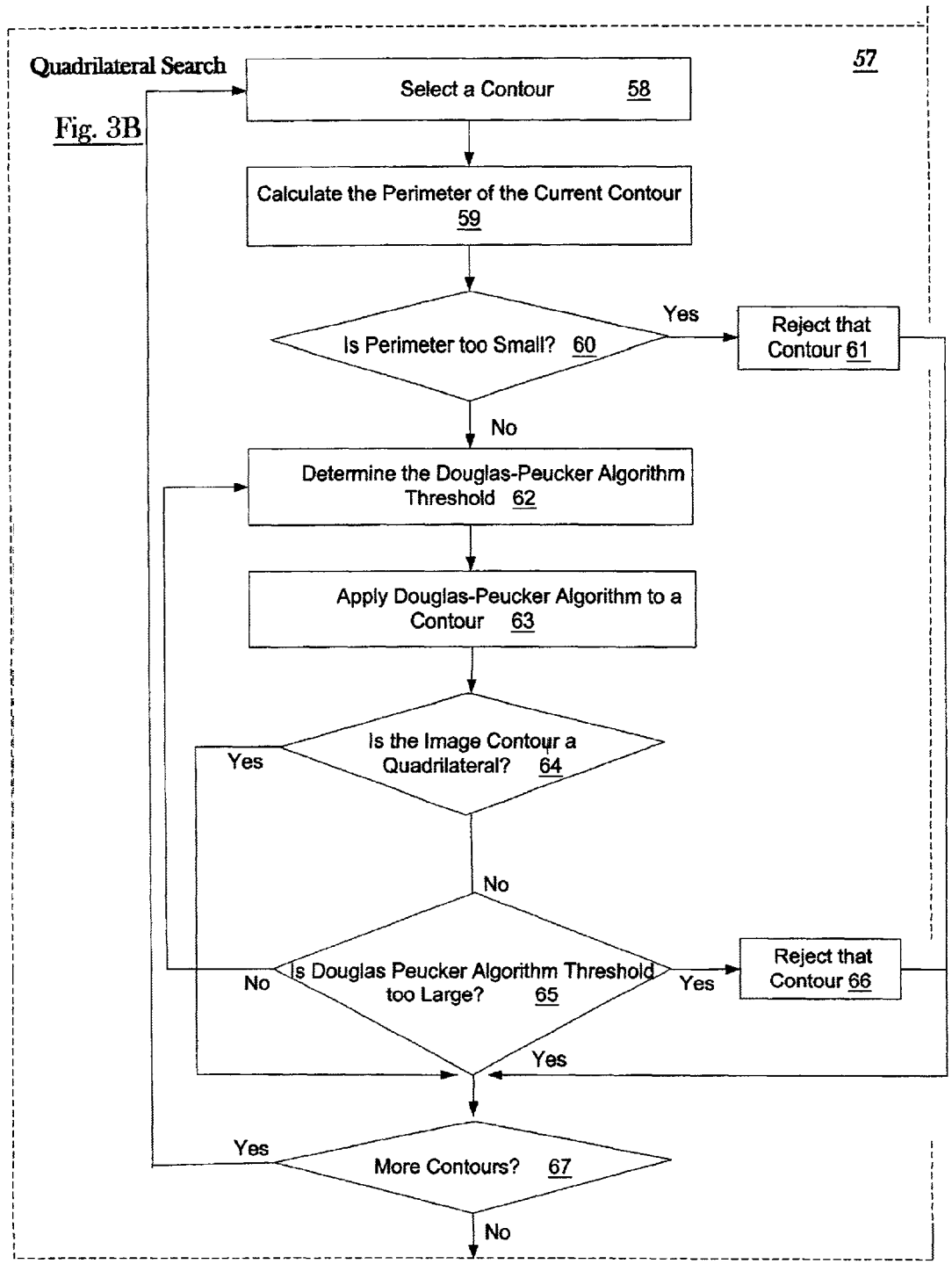

Referring to FIG. 3B, the contours are used to find quadrilateral shapes in the image that match up with the calibration object model. The process accordingly begins with a quadrilateral search 57. A contour is initially selected 58 and, for each contour, the perimeter of each identified region along the contour is calculated 59. If the length of the perimeter is too small 60, then the contour is rejected 61 either as not being a square on the calibration object or as being in an image for which the calibration object was too far from the camera. As mentioned above, it is preferred that the squares of the checkerboard are at least five pixels in each direction.

Next, the contour being processed is simplified into a quadrilateral shape using the Douglas-Peucker algorithm. An initial Douglas-Peucker threshold is set 62, preferably equal to 2. The Douglas-Peucker algorithm attempts to approximate a contour as a polygon with a minimal number of sides subject to a threshold. The threshold governs the maximum allowable deviation of the actual contour in the image pixels from the approximated contour of the approximated polygon. The Douglas-Peucker algorithm is applied 63 to try to simplify the contour being processed into a quadrilateral because the perspective projection of a checkerboard square onto the image plane should approximate a quadrilateral, subject to image noise and distortions. Then the approximated polygon is compared to the calibration image shape, in this case, a quadrilateral 64. If the set Douglas-Peucker threshold does not produce a quadrilateral from the contour being processed, the Douglas-Peucker threshold is increased 65. This cycle is repeated 67, applying the algorithm and increasing the threshold until, either the quadrilateral shapes emerge or the threshold becomes too high. In the present embodiment, the threshold is initially set at 2 and increased up to 10. If the threshold becomes too high 65, exceeds 10 in the present embodiment, before the calibration object shapes emerge, then the current contour being processed is rejected 66. If the resulting threshold is not too high, the Douglas-Peucker algorithm is run again with the new threshold 62. If the Douglas-Peucker algorithm does produce a quadrilateral from the contour being processed, that contour is accepted subject to the validation described below. After any contour is accepted or rejected as a quadrilateral, the process checks to see if there are any more contours to analyze 67 and if any are found selects the next contour 58. If all contours have been analyzed, then the process goes to quadrilateral validation 69 described below.

Referring to FIG. 3C, the found quadrilateral contour approximations are validated 69 by applying three tests. First a found quadrilateral is selected for the tests 70. The tests are as follows: (1) Is the found quadrilateral convex 71? If not, that contour is rejected 72. (2) Is the quadrilateral too oblong 73? If it is, that contour is rejected 74. (3) Is the quadrilateral a hole (i.e. a dark region within a light region) 76? If not, that contour is rejected 78. If the quadrilateral passes all three tests of the above validation, then the quadrilateral is accepted and the process moves to the next contour 80. If no more contours remain, then the corner points are identified as described below.

Figure 3D:
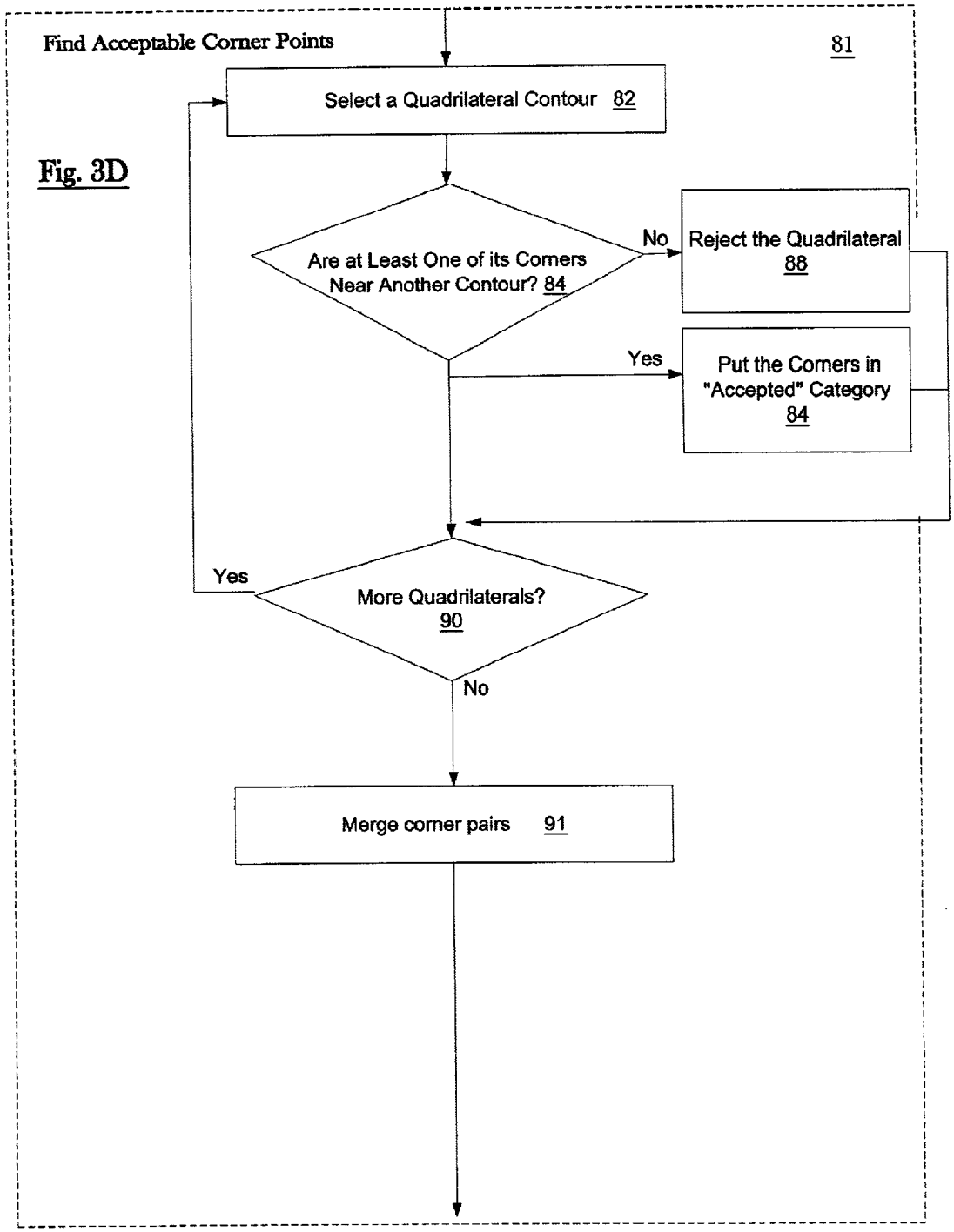

Referring to FIG. 3D, at this point, the accepted quadrilaterals derived from the selected contours are examined to see if they are part of the calibration object. This is done by finding the corner points for the calibration object shapes 81. Each accepted quadrilateral contour is selected 82 and examined. For the examination, first, at least one of the quadrilateral's corners must be near another different accepted quadrilateral's corner 84. The calibration object is a grid of contiguous squares. For different calibration objects, these tests as well as those used to find the contours and shapes originally would be suitably modified to correspond to the shapes of the calibration object. The example of this preferred embodiment is intended primarily to illustrate the principles involved. If at least one of the quadrilateral's corners is near another different accepted quadrilateral's corner, then the corner points of the quadrilateral are accepted as corner points of the calibration object 86. If not, then the quadrilateral is rejected from further processing 88. This is repeated until all of the accepted quadrilaterals are examined 90.

For each identified quadrilateral, there are candidate corners. As mentioned above, because dilation was used 54, corner intersections were turned into pairs of corner points. To identify the actual pixel locations of the corners of the image, the pairs of corners must be merged back together again 91. As a result, the candidate corners of each square are considered for merging. For each corner, another corner belonging to an adjacent square is searched out. Because the image was dilated, shared corners between adjacent squares (or quadrilaterals in the image of the squares) are separated into separate corners (corner pairs) for each square. When such a corner pair is found, the true shared corner between the two adjacent squares is taken to be the middle point on a line connecting the two corners. Preferably, the adjacent corner pair will be merged if abs(dx) +abs(dy)<10, where (dx, dy) is the (x, y) distance to the next nearest corner, and where abs is the absolute value. The candidate corners based on the dilated image pixel values are then ignored and the calculated middle point corner is taken to be the real corner in the calibration target. This process is repeated until all corner pairs have been merged.

Referring to FIG. 3E, after identifying the quadrilaterals and the corners for each of the squares of the calibration object, the corner points are ordered to identify the location of the calibration object in the image 93. A convex hull 94 is wrapped around all of the surviving corners. The lines defining the hull are smoothed again using the Douglas-Peucker algorithm with a low threshold 96 and checked to see if it is a quadrilateral 98. Since the preferred reference pattern is a nine square by seven square grid, its projection by the lens onto the sensor array should be a four-sided object with an aspect ratio related to nine by seven. The hull is accordingly compared to a convex quadrilateral with the appropriate aspect ratio 98. If the Douglas-Peucker algorithm does not result in a quadrilateral hull around the surviving corners with the proper aspect ratio, then the image is rejected 100.

If the image is not rejected, the top line of the quadrilateral hull is selected 102. Any candidate corners within a selected distance from the top line are taken to be corners along the line 104. If the calibration object has been correctly identified in the image, then there should be a set of eight or ten corners in a row (based again on the preferred nine by seven checkerboard grid calibration object as in FIG. 2). This number is compared to the actual number found 106. If the expected number of corners is not found, then the image is rejected 108. If the expected number of corner points is found, the found points are stored away as "fully accepted" in left to right order 110 and are deleted from further processing. The process then returns to find the convex hull of the remaining points 94. This is repeated until each accepted corner point is processed 112. If all points have been successfully stored away in order, the position of each point is refined to sub-pixel accuracy as described below.

To enhance the accuracy of the calibration model the location of each grid corner is preferably predicted to a sub-pixel accuracy 114. In other words, the location of a point in the image is defined, if appropriate, as being between measured pixels in the image. Consider, for example, one corner of which an approximate location p is known. This position p is the position determined from merging the corner pairs 91. The objective is to find its exact location q. Consider a neighborhood of pixels around the point p, large enough to contain q. This neighborhood is typically about 11×11 pixels in the preferred embodiment. Call pi a generic point in that neighborhood, and call i the image gradient vector at that point. For the black and white calibration object of the preferred embodiment, the image gradient vector is a vector of the brightness of the image pixels between the two points. Two cases are then possible: the point pi may either lie 1) on the boundary of the squares, or 2) within the squares.

Assume first that pi lies on the boundary of the squares. The boundary of the squares is straight lines. Since the corner q is at the intersection of these straight lines, the line connecting p and q must be orthogonal to the gradient vector i. This orthogonality follows from the fact that the vector i must be orthogonal to the square boundary. Thus, the dot product fo the vector from q to pi and the gradient is zero due to orthogonality. This constraint translates into one linear equation where q is the only unknown vector. Assume now that pi lies within the squares of the checkerboard. Then the image gradient at pi is zero because there is no gradient within uniform colored square regions. Then the dot product fo the vector from q to pi and the image gradient is also zero. Intuitively, this follows from the fact that zero vectors are orthogonal to any vector. Therefore, a list of linear equations can be collected for all points pi in the neighborhood of p in the unknown q. This linear system may then be solved in the least squares sense by performing a single matrix inversion. Once q is found, the same process is iterated a couple of times, by substituting p for q, to refine the estimate of the actual position of the corner. 4 iterations are typically enough. With this accomplished for all points, the calibration object has been identified and found with each point in the calibration object located with sub-pixel accuracy.

Conventionally, in high accuracy systems, this identification of the calibration shapes is done by a person by looking at a display of the image and then clicking on the contours of the image. The process requires a display, a keyboard and a pointing device, in addition to a fair amount of time by the person. The number and type of features in the image that must be identified by the person depends upon the particular system involved and the calibration object used. With the present invention, once the images are captured, human intervention is unnecessary. The method described above automatically finds the calibration object within each image.

Finally, with all of the calibration features linked to sub-pixel locations in the image, the image can be combined with the other images to calculate a calibration model for the camera. As mentioned above there are a variety of different calibration models. Typically, linear algebra is used to solve several equations in several unknowns using several images. For stereo calibration, the identified common points on the two images of the calibration object are correlated to map the precise location of the overlap in the field of view of the two cameras.

Figure 4:
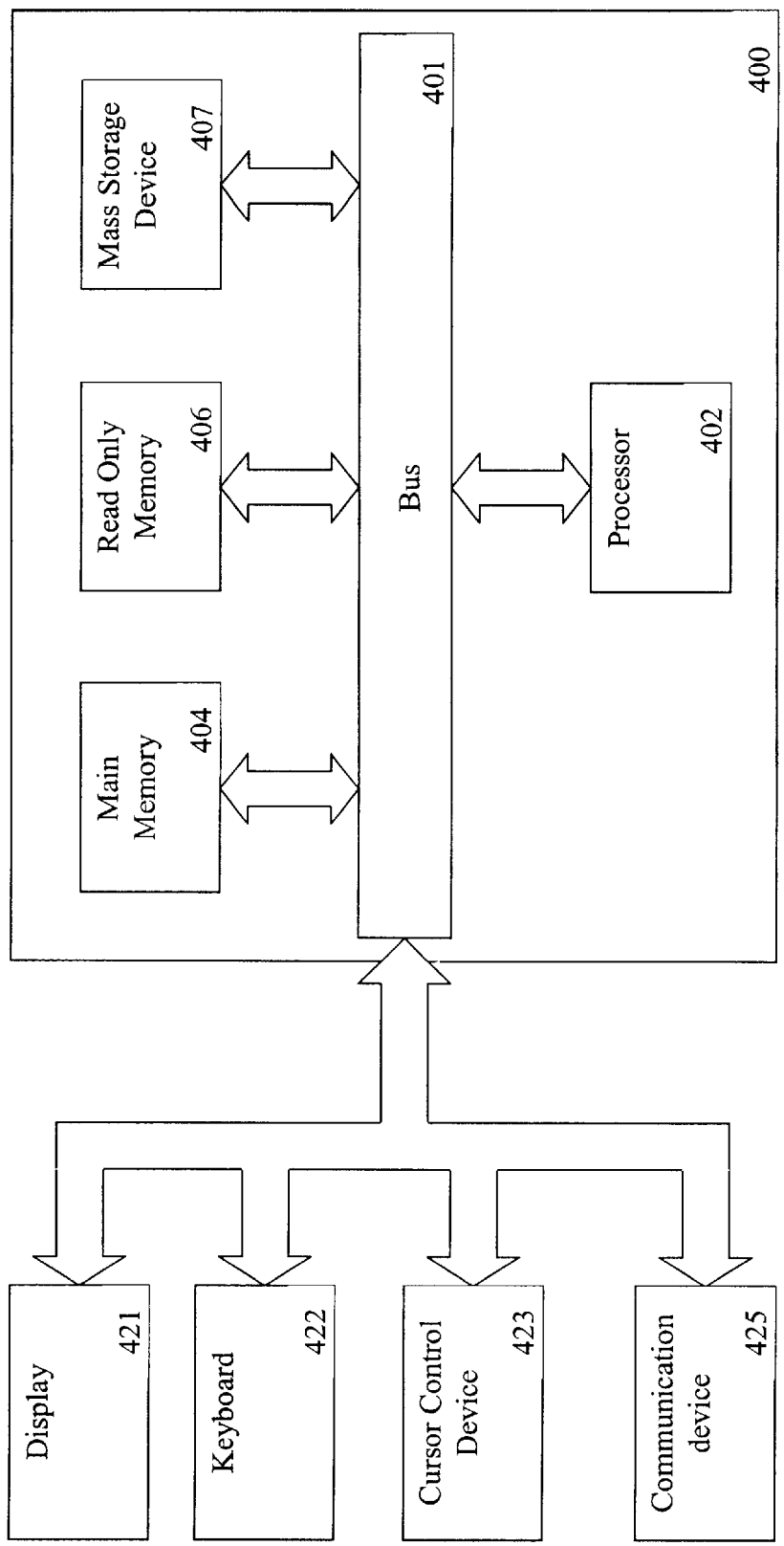
FIG. 4 is a schematic diagram of a computer system suitable for implementing the present invention.

A computer system 400 representing an example of a system upon which features of the present invention may be implemented is shown in FIG. 4. The computer system may be contained within the camera or it may be external. The computer system 400 includes a bus or other communication means 401 for communicating information, and a processing means such as a processor 402 coupled with the bus 401 for processing information. The computer system 400 further includes a random access memory (RAM) or other dynamic storage device 404 (referred to as a main memory), coupled to the bus 401 for storing information and instructions to be executed by the processor 402. The main memory 404 also may be used for storing temporary variables or other intermediate information during execution of instructions by the processor 402. The computer system 400 may also include a read only memory (ROM) or other static storage device 406 coupled to the bus 401 for storing static information and instructions for the processor 402.

A data storage device 407 such as a magnetic disk or optical disc and its corresponding drive may also be coupled to the computer system 400 for storing information and instructions. The computer system 400 can also be coupled via the bus 401 to a display device 421, such as a cathode ray tube (CRT) or Liquid Crystal Display (LCD), for displaying information to an end user. For example, graphical and/or textual indications of installation status, time remaining in the trial period, and other information may be presented to the prospective purchaser on the display device 421. Typically, an alphanumeric input device 422, including alphanumeric and other keys, may be coupled to the bus 401 for communicating information and command selections to the processor 402. Another type of user input device is a cursor control 423, such as a mouse, a trackball, or cursor direction keys for communicating direction information and command selections to the processor 402 and for controlling cursor movement on the display 421.

A communication device 425 is also coupled to the bus 401. The communication device 425 may include a modem, a network interface card, or other well known interface devices, such as those used for coupling to Ethernet, token ring, or other types of physical attachment for purposes of providing a communication link to support a local or wide area network, for example. In any event, in this manner, the computer system 400 may be coupled to a number of clients or servers via a conventional network infrastructure, such as a company's Intranet and/or the Internet, for example.

It is appreciated that a lesser or more equipped computer system than the example described above may be desirable for certain implementations. Therefore, the configuration of computer system 400 will vary from implementation to implementation depending upon numerous factors, such as price constraints, performance requirements, technological improvements, or other circumstances.

It should be noted that, while the steps described herein may be performed under the control of a programmed processor, such as the processor 402, in alternative embodiments, the steps may be fully or partially implemented by any programmable or hard coded logic, such as Field Programmable Gate Arrays (FPGAs), TTL logic, or Application Specific Integrated Circuits (ASICs), for example. Additionally, the method of the present invention may be performed by any combination of programmed general purpose computer components or custom hardware components. Therefore, nothing disclosed herein should be construed as limiting the present invention to a particular embodiment wherein the recited steps are performed by a specific combination of hardware components.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps, described above. The steps of the present invention may be performed by hardware components or may be embodied in machine-executable instructions, which may be used to cause a general-purpose or special-purpose processor or logic circuits programmed with the instructions to perform the steps. Alternatively, the steps may be performed by a combination of hardware and software.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Importantly, while embodiments of the present invention have been described with reference to taking images with a camera and calibrating the cameras using the images, the method and apparatus described herein are equally applicable to calibrating other types of imaging devices. In addition, it is not necessary that the taking of the images and the calibrating be performed at the same time or place or using the same equipment.

What is claimed is:

1. A method comprising:
   receiving an array of pixels produced by a camera, the pixels corresponding to an image of a calibration object, the calibration object having a known reference pattern;
   classifying each pixel of the image as light or dark;
   extracting contours from the image by identifying lines between light and dark pixels;
   comparing the extracted contours to the shapes of the known reference pattern; and
   identifying the shapes of the known reference pattern in the image using the extracted contours.

2. The method of claim 1 wherein the image is a color image, the method further comprising converting color information in the pixels of the image into gray scale values to render the image as a gray scale image before classifying the pixels.

3. The method of claim 1 wherein classifying each pixel comprises applying a brightness threshold to each pixel of the image to classify those pixels having a brightness greater than the threshold as light and those below the threshold as dark.

4. The method of claim 3 wherein the brightness threshold is determined by the mean brightness value of the pixels in the image reduced by a portion of the highest brightness value of any pixel.

5. The method of claim 1 further comprising dilating the image after classifying each pixel.

6. The method of claim 1 wherein extracting the contours comprises applying the Douglas-Peucker algorithm to approximate a simple smooth shape.

7. The method of claim 6 wherein applying the Douglas-Peucker algorithm comprises drawing a connected arc along a contour that is confined to within a line threshold of being a line.

8. The method of claim 7 wherein applying the Douglas-Peucker algorithm comprises adaptively modifying the line threshold to obtain the calibration object shapes.

9. The method of claim 1 wherein identifying the contours comprises rejecting contours that correspond to contours on the calibration object that are smaller than a threshold size.

10. The method of claim 1 wherein identifying the contours comprises rejecting contours that correspond to contours on the calibration object that are distorted in shape by more than a threshold amount.

11. The method of claim 1 wherein the calibration object shapes are ordered quadrilaterals and wherein comparing the contours further comprises drawing perimeters around the extracted contours, examining the perimeters to identify quadrilaterals, rejecting perimeters that do not correspond to quadrilaterals, and finding corners for each perimeter, and wherein identifying the shapes further comprises ordering the corners to correspond to the quadrilaterals of the calibration object, and rejecting all identified quadrilaterals that are not within the ordering.

12. The method of claim 1 wherein the calibration object shapes are ordered quadrilaterals and wherein identifying the shapes further comprises extracting quadrilateral corner points from the extracted contours, drawing a perimeter around the extracted quadrilateral corner points, and identifying corners in the perimeter, and wherein identifying the shapes further comprises, counting the corners on each edge of the quadrilateral perimeter.

13. A machine-readable medium having stored thereon data representing sequences of instructions which, when executed by a processor, cause the processor to perform operations comprising:
   receiving an array of pixels produced by a camera, the pixels corresponding to an image of a calibration object, the calibration object having a known reference pattern;
   classifying each pixel of the image as light or dark;
   extracting contours from the image by identifying lines between light and dark pixels;
   comparing the extracted contours to the shapes of the known reference pattern; and
   identifying the shapes of the known reference pattern in the image using the extracted contours.

14. The medium of claim 13 wherein the instruction further comprise instruction for dilating the image after classifying each pixel.

15. The medium of claim 13 wherein the instruction for extracting the contours comprise applying the Douglas-Peucker algorithm to approximate a simple smooth shape.

16. The medium of claim 13 wherein the calibration object shapes are ordered quadrilaterals and wherein the instruction for comparing the contours further comprise drawing perimeters around the extracted contours, examining the perimeters to identify quadrilaterals, rejecting perimeters that do not correspond to quadrilaterals, and finding corners for each perimeter, and wherein the instructions for identifying the shapes further comprise ordering the corners to correspond to the quadrilaterals of the calibration object, and rejecting all identified quadrilaterals that are not within the ordering.

17. An apparatus for identifying a calibration object in an image comprising:

- means for receiving an array of pixels produced by a camera, the pixels corresponding to an image of a calibration object, the calibration object having a known reference pattern;
- means for classifying each pixel of the image as light or dark;
- means for extracting contours from the image by identifying lines between light and dark pixels;
- means for comparing the extracted contours to the shapes of the known reference pattern; and
- means for identifying the shapes of the known reference pattern in the image using the extracted contours.

18. The apparatus of claim 17 wherein the means for extracting the contours comprises means for applying the Douglas-Peucker algorithm to approximate a simple smooth shape.

19. The apparatus of claim 17 wherein the calibration object shapes are ordered quadrilaterals and wherein the means for comparing the contours further comprises means for drawing perimeters around the extracted contours, means for examining the perimeters to identify quadrilaterals, means for rejecting perimeters that do not correspond to quadrilaterals, and means for finding corners for each perimeter, and wherein the means for identifying the shapes further comprises means for ordering the corners to correspond to the quadrilaterals of the calibration object, and means for rejecting all identified quadrilaterals that are not within the ordering.

* * * * *